US012658576B2

(12) United States Patent
El Ajmi et al.

(10) Patent No.: US 12,658,576 B2
(45) Date of Patent: Jun. 16, 2026

(54) IO-LINK WIRELESS COMMUNICATION

(71) Applicant: Schneider Electric Industries SAS, Rueil Malmaison (FR)

(72) Inventors: Mohammed El Ajmi, Nieul-lès-Saintes (FR); Jean-Yves Boulanger, Garat (FR); Bertrand Fruchard, L'Isle d'Espagnac (FR)

(73) Assignee: SCHNEIDER ELECTRIC INDUSTRIES SAS, Rueil Malmaison (FR)

( * ) Notice: Subject to any disclaimer, the term of this patent is extended or adjusted under 35 U.S.C. 154(b) by 170 days.

(21) Appl. No.: 18/441,040

(22) Filed: Feb. 14, 2024

(65) Prior Publication Data

US 2024/0275043 A1 Aug. 15, 2024

(30) Foreign Application Priority Data

Feb. 15, 2023 (EP) .................................... 23305200

(51) Int. Cl.
*H01Q 9/04* (2006.01)
*H01Q 3/36* (2006.01)

(52) U.S. Cl.
CPC ............ *H01Q 3/36* (2013.01); *H01Q 9/0492* (2013.01)

(58) Field of Classification Search
CPC ............................... H01Q 3/36; H01Q 9/0492
See application file for complete search history.

(56) References Cited

U.S. PATENT DOCUMENTS 11,362,425 B2 * 6/2022 Ananth .................. H01Q 21/28
11,606,688 B2 * 3/2023 Tal .......................... H04L 9/085
2007/0207747 A1 * 9/2007 Johnson ................... H04B 1/52
455/78
2020/0267540 A1 * 8/2020 Tal ......................... H04B 1/713
2021/0098896 A1 * 4/2021 Wang ....................... H04B 7/10
2023/0209335 A1 * 6/2023 Tal ............................ H04L 9/08
713/171
2023/0291448 A1 * 9/2023 Kompala ............. H04B 7/0682
2023/0387998 A1 * 11/2023 Li ........................ H04B 7/0413

OTHER PUBLICATIONS

European Search Report and Search Opinion dated Jul. 17, 2023 for corresponding European Patent Application No. EP23305200.0, 8 pages.

* cited by examiner

*Primary Examiner* — Awat M Salih
(74) *Attorney, Agent, or Firm* — Quinn IP Law

(57) ABSTRACT

An apparatus for short distance wireless industrial communications, including a set of radio frequency transceivers. The apparatus including: a splitter connected to tracks linked to the set of radio frequency transceivers and connected to only one antenna, wherein the antenna is a circular polarization antenna, and wherein the splitter includes a 90 degrees phase shifter.

10 Claims, 1 Drawing Sheet

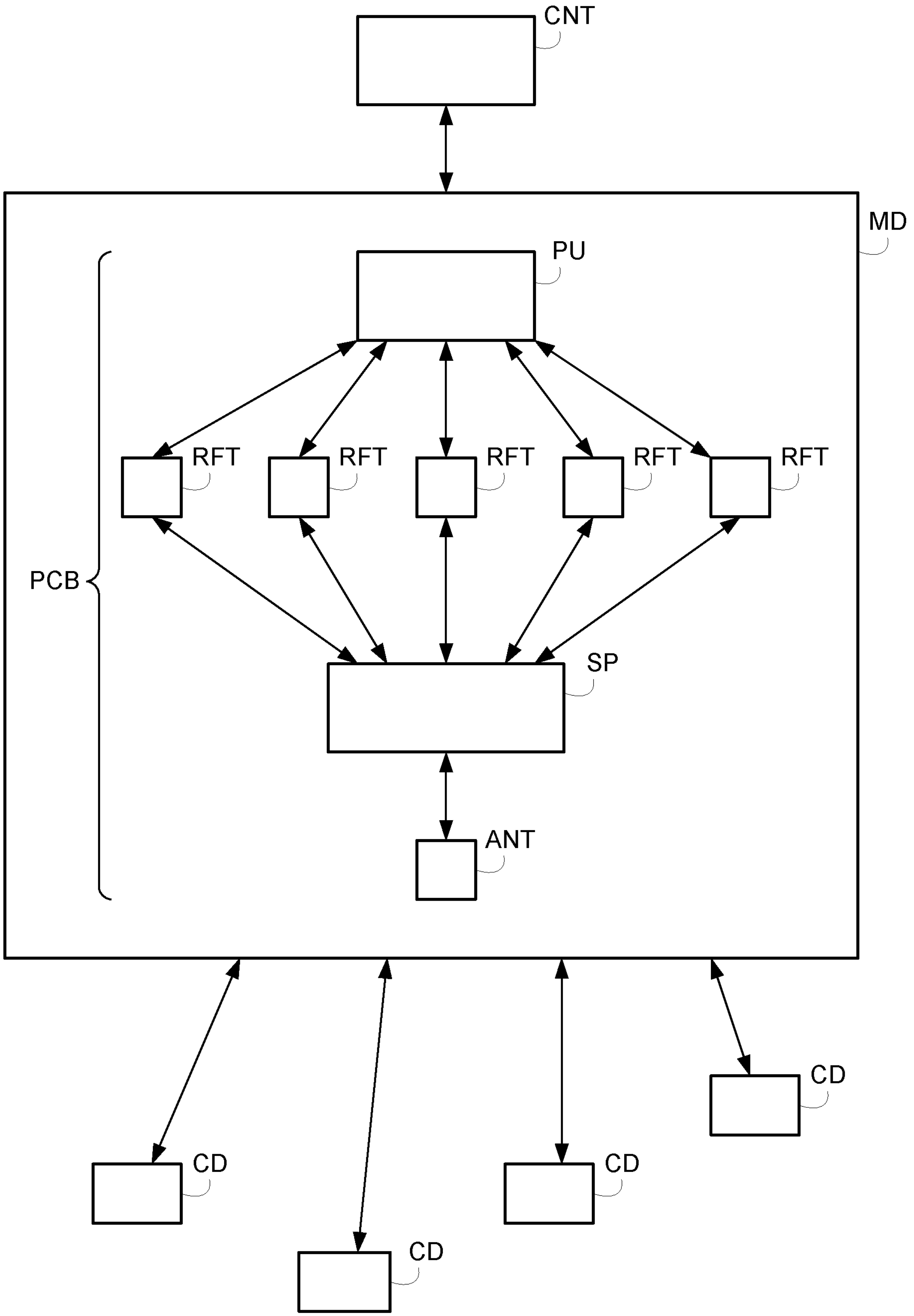
CNT
MD
PU
PCB
RFT
RFT
RFT
RFT
RFT
SP
ANT
CD
CD
CD
CD
CD

IO-LINK WIRELESS COMMUNICATION

FIELD OF INVENTION

The present invention relates to a short-distance radio-frequency communications system allowing equipment to communicate with a plurality of modules with the aid of a wireless link. This invention may in particular be applied to a system comprising a plurality of dialogue units communicating with a master module. These various dialogue units are for example push-buttons or switches, visual or acoustic signaling units (a lamp, a buzzer, etc.), sensors or detectors, actuators, etc.

BACKGROUND

Industrial automation/control systems are employed for controlling operation of a wide variety of systems, including processes, machines, etc., and are typically adaptable to different control applications through configuration and interconnection of multiple control system components or devices, such as control modules, Input/Output (I/O) modules, I/O devices, etc. Existing industrial control systems typically include a processor running or executing a control program to interact with an I/O system (e.g., typically one or more I/O modules or devices) to receive system information in the form of analog and/or digital inputs from field sensors and to provide outputs (analog and/or digital) to one or more actuators. Industrial control systems are increasingly being interconnected with management information and other systems in a manufacturing facility, and may be operatively connected to any number of communications networks to facilitate various business management functions such as inventory control, accounting, manufacturing control, etc., in addition to the process/machine control functionality.

For example, the following two wireless technologies are used by such industrial automation/control systems. Zigbee Green Power provides 16 Channels for communication with 2 MHz bandwidth reserved for each channel and a data rate of 250 kbit/s. Bluetooth Low Energy provides 40 Channels with 1 MHz bandwidth reserved for each channel and a data rate of 1 Mbit/s.

These wireless technologies have drawbacks in the way they offer a radiocommunication that is not robust and can be disturbed each other, by WiFi, 4G, 5G transmitters and any wireless technology in the same bandwidth, resulting sometimes in a loss of the wireless connection.

A new wireless technology, called IO-Link Wireless was then introduced to overcome some of these drawbacks. The IO-Link Wireless technology is an improvement of Bluetooth Low Energy with a lower latency time of 5 ms, an availability to use blacklist channels to avoid disturbances channels and a very good frame error rate or reliability.

IO-Link Wireless is a system organized around masters and devices and manages up to 3 Masters in area of around 10 m for example. Each master can manage 5 tracks and thus requires 5 antennas for communication.

There is therefore a need to find a simple, space-saving and economical solution for improving the efficiency of a communication system compliant with IO-Link Wireless technology.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided an apparatus for short distance wireless industrial communications, comprising a set of radio frequency transceivers, the apparatus comprising:

- a splitter connected to tracks linked to the set of radio frequency transceivers and connected to only one antenna,
- wherein the antenna is a circular polarization antenna,
- wherein the splitter comprises a 90 degrees phase shifter.

Advantageously, the presence of only one antenna reduces greatly the size of the apparatus and avoids internal interference between apparatus track's antennas (only one antenna here) as well as with the environment (no other antenna). The apparatus allows to use several splitters/composers for dealing with more wireless tracks always through one unique antenna.

In an embodiment, the apparatus is adapted for bi-directional, digital, point-to-point, wireless industrial communications.

In an embodiment, the apparatus is compliant with IO-Link Wireless technology.

In an embodiment, the apparatus comprises a processing unit adapted to increase the signal level based on the number of radio frequency transceivers. The apparatus is able to increase the power transmission of each track to compensate the insertion loss of the splitter/composer while respecting the wireless regulations.

In an embodiment, the apparatus comprises a printed circuit board on which is printed the antenna.

In an embodiment, the antenna is one of a helical antenna, a dipole antenna, a meander antenna and a planar inverted-F antenna.

In an embodiment, the tracks are conductive tracks integrated in one and the same printed circuit board (PCB) and connecting the radio frequency transceivers (RFT) to the splitter.

The apparatus allows to reduce the received signal noise by using only one antenna (no radio-frequency diaphony with other antenna), which permits also an optimized number of retries to assure a better latency.

BRIEF DESCRIPTION OF THE FIGURES

The detailed description is described with reference to the accompanying FIGURE. In the FIGURE, the left-most digit(s) of a reference number identifies the FIGURE in which the reference number first appears. Some embodiments of system and/or methods in accordance with embodiments of the present subject matter are now described, by way of example only, and with reference to the sole accompanying FIGURE, in which:

FIG. 1 shows a simplified diagram of a communications system according to one embodiment.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

With the evolution of the industrial communication, machine-to-machine communication such as connected robots, warehouse automation, and factory processing machinery are becoming more and more prevalent and demanding higher availability, better robustness, lower latency, and deterministic patterns. Cable-based communication cannot fulfil all the requirements demanded by the tremendous increase in connected devices in terms of flexibility, mobility and monitoring. IO-Link Wireless, an extension of the IO-Link standard, is a wireless protocol that addresses these needs and presents reliable and deterministic wireless communication to sensors and actuator.

The IO-Link Wireless standard presents a reliable, real-time and deterministic protocol for industrial factory automation control systems and extends the serial wired cables in industrial control applications, adding mobility and flexibility that are missing in the wired protocol.

IO-Link Wireless defines wireless network communication between sensors, actuators and controllers (PLC) in the factory automation environment. It was designed to provide a similar level of performance and backward compatible interface as with cables. IO-Link Wireless provides deterministic latency of 5 ms communication with 40 nodes (sensors or actuators). It presents reliability that is better than 10e-9 Packet Error Rate (PER).

With reference to FIG. 1, a communication system comprises a controller CNT, a master device MD and a set of communication devices CD.

The communication system forms an IO-Link Wireless system consisting of an IO-Link Wireless fieldbus gateway (as master device) and IO-Link Wireless devices (as communication devices).

The controller CT can be a programmable Logic Controller PLC, a Programmable Automation Controller PAC, or other type of processing device.

The communication devices CD can be sensors, actuators, RFID-readers, valves, motor starters or simple I/O-modules.

Each communication device CD comprises an air interface to exchange data with the master device MD.

The master device MD comprises a processing unit PU, a printed circuit board PCB, a set of radio frequency transceivers RFT, a splitter SP and an antenna ANT.

The master device MD can comprise up to five (small band) radio frequency transceivers RFT with their own track and dedicated frequency channels for transmitting messages from the master device MD to the communication devices CD. Each track can serve up to 8 communication devices CD and send and receive alternately. In one embodiment, all tracks of a master device MD can send at the same time on different frequencies according to a computed frequency hopping tables.

The master device MD communicate with the communication devices CD through bi-directional, digital, point-to-point, wireless industrial communications.

The set of radio frequency transceivers RFT is connected to the splitter SP that is linked to the antenna ANT. The set of transceivers is finally linked to only one antenna instead of having each transceiver linked to its own antenna. Thus the coupling between the antennas (compared to classic device with many antennas) is greatly reduced, which reduces interference and improves the wireless link budget.

A classic antenna for a classic IO-Link Wireless system has linear polarization, being a horizontal or vertical antenna with a radiation pattern that is not omnidirectional (No radiation in the antenna axis). The number of classic antennas for a classic IO-Link Wireless leads to reduce the radiofrequency range link for some orientations of antenna.

The antenna ANT is designed to have a circular polarization.

In one embodiment, the antenna ANT is a combination of two antennas (Horizontal and Vertical) linked to a 90 degrees shifter. The use of circular polarization ensures good wireless communication between the master device and the communication devices regardless of their spatial orientation.

The radiation pattern of the antenna ANT is omnidirectional (same radiation in all space direction) and the radiofrequency range link is identical for all antenna orientations.

In one embodiment, the antenna ANT could be any kind of shorted patch antenna, that can be printed on printed circuit board PCB and used for wireless circuitry implemented in microstrip.

In one embodiment, the main antenna is a planar inverted-F antenna (PIFA), a helical antenna or meander antenna.

The printed circuit board PCB can be designed depending on the device it is incorporated in. The printed circuit board PCB should present an overall consistency between the length of the conductive tracks and the power of the radio frequency transceivers RFT. The tracks are passive electronic assembly with a defined shape which allows the waves to be distributed uniformly on all the tracks. The shape and dimensions of the tracks can thus be defined for a desired spectrum of waves to be transmitted.

The processing unit PU is configured to transmit and receive data wirelessly between the master device and the communication devices.

In one embodiment, a transmission cycle can consist of two phases. In a first phase, to transmit output data, the master device sends downlink data in a multicast frame for the communication devices in assigned time slots. In a second phase, the master device collects in uplink data from the communication devices which transmit one after the other according to an agreed fixed scheme.

In one embodiment, the processing unit PU uses a narrow band like GFSK (Gaussian Frequency Shift Keying) modulation. This modulation enjoys high power efficacy and good rejection to interferers, but also immunity to channel fading due to the narrow band, 1 MHz. The processing unit PU can use a combination of a frequency and time division media access scheme (F/TDMA). Messages can be exchanged between the master device and the communication devices in a half-duplex mode in a defined timeframe.

In one embodiment, the processing unit PU uses two mechanisms, frequency hopping and dynamic blacklisting, which allows operation of the wireless sensor/actuator network with low packet-error rates even in industrial plants where three WLAN bands are allocated in the 2.45 GHz band.

The processing unit PU is further configured to increase the signal level based on the number of radio frequency transceivers. In order to compensate for the insertion losses of the splitter SP, the wireless power transmitted from the master device MD can be increased (for example 10 mW instead of 2 mW). The wireless transmitted power of the communication devices CD can also be increased in compliance with the required wireless standards.

An embodiment comprises a master device MD under the form of an apparatus comprising one or more processor(s), I/O interface(s), network interfaces, and a memory coupled to the processor(s). The processor(s) may be implemented as one or more microprocessors, microcomputers, microcontrollers, digital signal processors, central processing units, state machines, logic circuitries, and/or any devices that manipulate signals based on operational instructions. The processor(s) can be a single processing unit or a number of units, all of which could also include multiple computing units. Among other capabilities, the processor(s) are configured to fetch and execute computer-readable instructions stored in the memory.

The functions realized by the processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory includes modules and data. The modules include routines, programs, objects, components, data structures, etc., which perform particular tasks or implement particular abstract data types. The data, amongst other things, serves as a repository for storing data processed, received, and generated by one or more of the modules.

A person skilled in the art will readily recognize that steps of the methods, presented above, can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. An apparatus for wireless communications, comprising:

a plurality of radio frequency transceivers each configured to transmit and receive wireless signals at a different one of a plurality of frequencies;

a splitter electrically connected by a plurality of conductive tracks to the plurality of radio frequency transceivers, each one of the plurality of transceivers connected to the splitter by one of the plurality of conductive tracks, wherein the splitter comprises a 90 degree phase shifter, and wherein a physical configuration of each of the plurality of tracks corresponds to the one of the plurality of frequencies to which the one of the plurality of tracks is coupled; and a circular polarization antenna operatively coupled to the splitter, wherein the circular polarization antenna is configured to wirelessly transmit the wireless signals received from the plurality of radio frequency transceiver received via the splitter.

2. The apparatus according to claim 1, wherein the apparatus is adapted for bi-directional, digital, point-to-point, wireless industrial communications.

3. The apparatus according to claim 1, wherein the apparatus is compliant with IO-Link Wireless technology.

4. The apparatus according to claim 1, wherein the apparatus comprises a processing unit adapted to set a signal level output by the circular polarization antenna based on a number of the plurality of radio frequency transceivers.

5. The apparatus according to claim 4, wherein the processing unit is configured to set a signal level approximately equal to two (2) milliwatts of power for each one of the plurality of radio frequency transceivers.

6. The apparatus according to claim 4, wherein the processing unit is configured to apply at least one of frequency hopping and dynamic blacklisting in transmission of wireless signals from the antenna.

7. The apparatus according to claim 4, wherein the processing unit is configured to cause the apparatus to transmit over a narrow frequency band of approximately one (1) megahertz.

8. The apparatus according to claim 1, wherein the apparatus comprises a printed circuit board on which the circular polarization antenna and the tracks are printed.

9. The apparatus according to claim 1, wherein the circular polarization antenna is one of a helical antenna, a dipole antenna, a meander antenna and a planar inverted-F antenna.

10. The apparatus according to claim 1, further comprising a printed circuit board on which the plurality of radio frequency transceivers, the splitter, and the circular polarization antenna are positioned, wherein the tracks are integrated in the printed circuit board.

* * * * *